United States Patent [19]

Silvano et al.

[11] Patent Number: 4,872,695
[45] Date of Patent: Oct. 10, 1989

[54] TORQUE-MULTIPLYING KINEMATIC DEVICE PARTICULARLY FOR BICYCLES AND BICYCLES EMPLOYING SAID KINEMATIC DEVICE

[75] Inventors: Tomba Silvano; Giuseppe Tomba, both of Montecchio Maggiore, Italy

[73] Assignee: Brai Systems SRL, Vicenza, Italy

[21] Appl. No.: 174,968

[22] Filed: Mar. 29, 1988

[30] Foreign Application Priority Data

Apr. 3, 1987 [IT] Italy .................. 85527 A/87

[51] Int. Cl.⁴ .................. B62M 1/02; B62M 1/04
[52] U.S. Cl. .................. 280/257; 74/594.3
[58] Field of Search .............. 280/252, 256, 257, 259, 280/236, 260; 74/594.3

[56] References Cited

U.S. PATENT DOCUMENTS 623,692  5/1899  Anderson .................. 280/257

FOREIGN PATENT DOCUMENTS

845922  9/1939  France .................. 280/257
23401  12/1894  United Kingdom .................. 280/257
18405  10/1895  United Kingdom .................. 280/257
12325  6/1896  United Kingdom .................. 280/257

Primary Examiner—Charles A. Marmor
Assistant Examiner—Karin Tyson
Attorney, Agent, or Firm—Birch, Stewart, Kolasch & Birch

[57] ABSTRACT

A torque-multiplying kinematic device for use on a traditional rear wheel chain driven bicycle includes a pair of rods, each rod consisting of a foremost portion inclined from a rearmost portion, a pair of pivot connectors and a pair of guiding supports. Each of the rods is connected at the elbow formed by the two portions to a pedal mount on the bicycle cranks by a pivot connector. The foremost portion of each rod is holded in the end opposite the elbow to mount a bicycle pedal while the rearmost portion extends rearward to connect in a reciprocating sliding relationship with a corresponding guiding support mounted on the back fork of the bicycle, the guiding supports rotatable co-axially with the rotational axis of the wheel held between the arms of the back forth. In operation, by virtue of the inclined foremost portion of the rod on which the pedal is mounted, the cyclist can increase the useful torque to the cranks with the muscular effort remaining the same without a significant increase in the likelihood of striking the surface upon which the bicycle is ridden.

7 Claims, 6 Drawing Sheets

TORQUE-MULTIPLYING KINEMATIC DEVICE PARTICULARLY FOR BICYCLES AND BICYCLES EMPLOYING SAID KINEMATIC DEVICE

BACKGROUND OF THE INVENTION

The invention concerns the realization of a torque multiplying kinematic device, particularly for bicycles. Many kinematic devices already exist. All of them tend to fulfil the purpose of increasing the torque necessary for the motion of the bicycles while keeping the ensuing muscular effort practically constant.

One of the most immediate solutions consists in the increase of the necessary torque by increasing the length of the bicycle cranks.

Such solution, however valid in principle and possible to realize in the practice, presents some problems. One of the first problems consists in the necessity of lifting the axis of rotation of the cranks in relation to the ground, in order to allow between the pedal, when it is in its lowest dead-end position, and the road surface, a certain safety height, so as to prevent the pedal from scaping on the ground.

A second drawback is represented by the fact that such solution brings about the necessity of increasing the leg-straddling angle necessary for the performance of the thrust of the foot on the pedals.

One more drawback arising from what has just been described consists in that this solution brings about the increase of the angle of inclination of the straight line for the appliance of the thrust on the pedals with the consequent increase of its value, its vertical component usable to generate the motion remaining the same.

SUMMARY OF THE INVENTION

One object of this invention is that of realizing a torque-multiplying kinematic device capable of increasing the torque in the back wheel of the bicycle while doing away with the mentioned drawbacks.

Another goal of the invention is increasing the available torque while maintaining the radius of rotation of the pedals equal to the radius of rotation which the same pedals would have in a normal-type bicycle. Meeting such objective provides an advantage in that the physical effort of the pedalling motion remains unaltered.

A second advantage consists in the possibility of using very low gear ratios even at the stage of departure from a stillstand of the bicycle, since the torque-multiplying device considerably decreases the effort necessary for the first getaway.

Yet another advantage ensuing from the availability of higher torques, the effort on the pedals remaining unchanged, is the opportunity for higher forward speeds of bicycles, due to the possibility of developing more power.

Not the last advantage consists in that the kinematic device being the object of the invention is applicable to any bicycle without having to perform on the latter any mechanical or structural alteration, but simply by adding the parts forming the kinematic device herein disclosed.

The described objectives and advantages as well as others, which will be better understood hereafter, are reached with the realization of a torque-multiplying kinematic device, particularly suited for bicyles which, in accordance with the patent claims, includes a pair of bars, the shape of each mirroring the shape of the other, each held in an intermediate position, into each of which holes a cylindrical pivot is engaged, each of said pivots connecting each bar with each end of the cranks of a bicycle, characterized in that each bar presents an end with a slanted axis, drilled in its terminal part and suited to receive a pedal, and the other end, preferably having a cylindrical cross-section, suited to slide within a tube-shaped support having a round guiding cross-section, further characterized in that said tube-shaped guiding support is fastened to the back fork of the bicycle by means of a bolt and in that said support rotates around the fastening point, following the bar during the extentions performed by the latter because of the rotating movement of the pedals.

Other construction and functional details will be better understood from the description of a preferred form of execution of the invention, which is given by way of example only, but is not meant to limit its scope, and which is illustrated in the enclosed tables of drawing.

DESCRIPTION OF THE PREFERRED EMBODIMENTS

Figure 1:
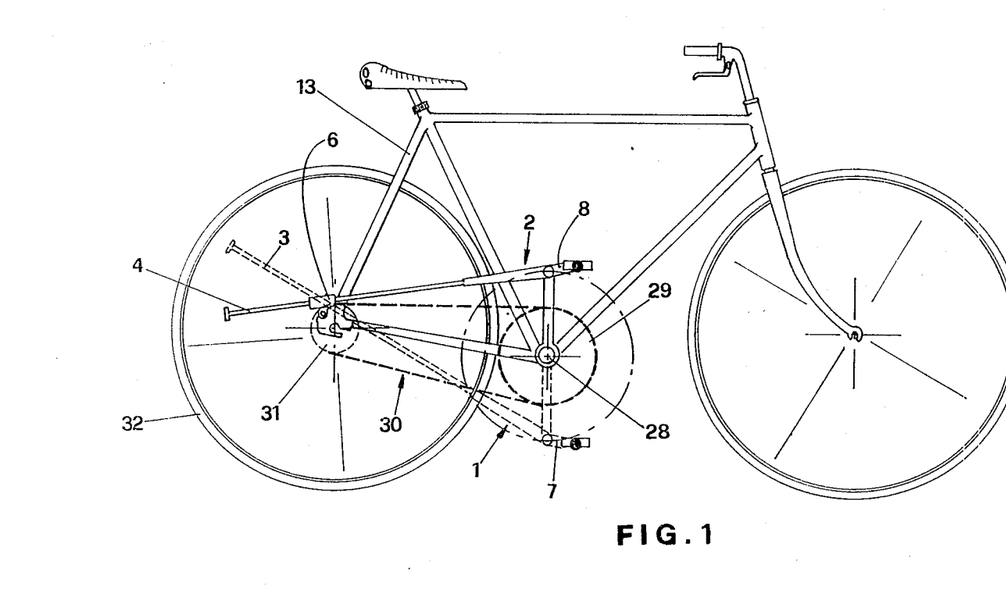
FIG. 1 shows a view of the bicycle complete with the torque-multiplying device being the object of the invention.
Figure 2:
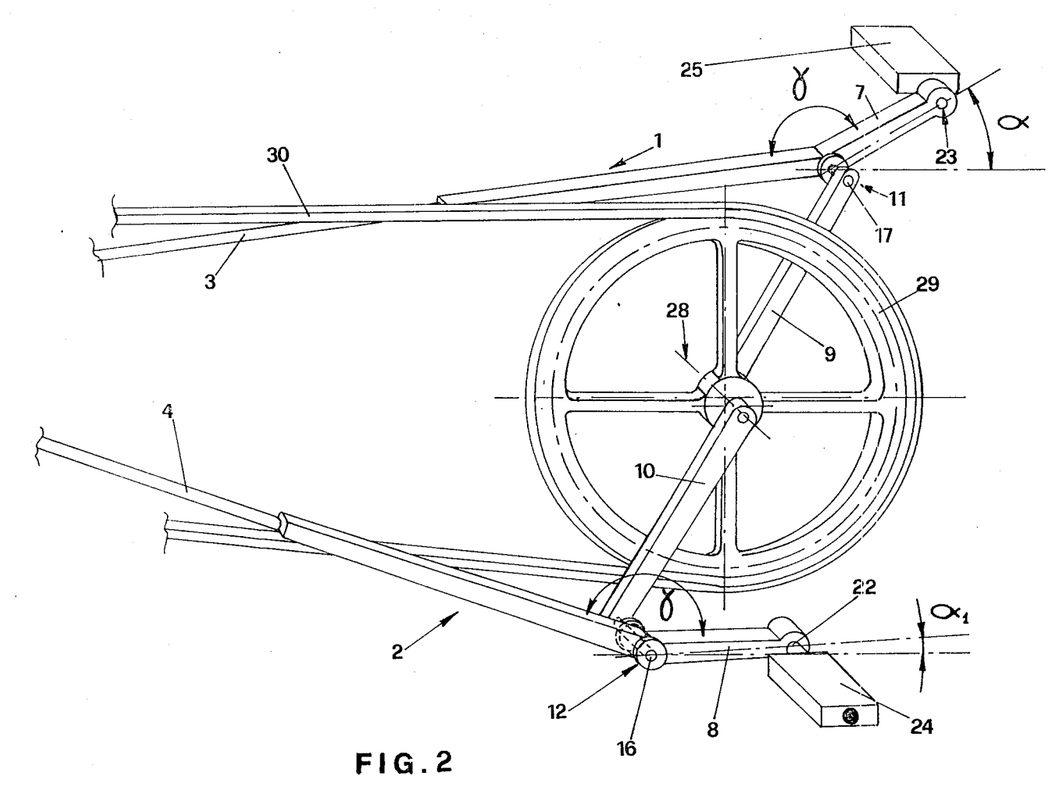
FIG. 2 shows the detail of the bar-pedal-crank connection.
Figure 8:
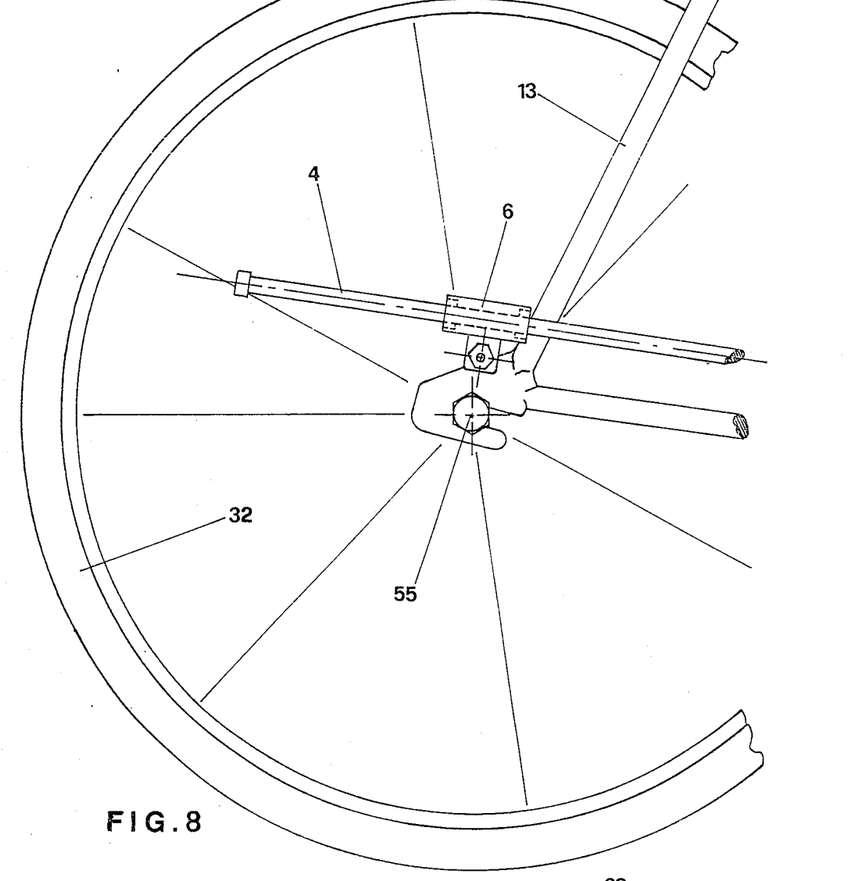
FIG. 8 shows the detail of the back fork of the bicycle with the sliding support of the bar.
Figure 9:
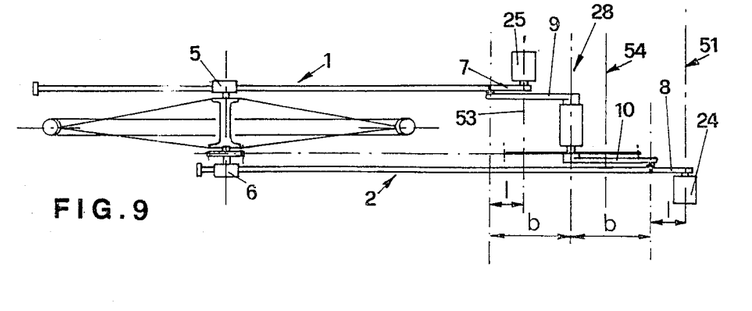
FIG. 9 is a top view of the assembled torque-multiplying device.

With reference to the FIGS. 1 and 2 it can be observed that the bars 1 and 2 present their elongated back end 3 and 4 having a constant round cross-section and their front end 7 and 8 slanted by a γ angle in relation to the axis of the bar; said bars are connected to the heads 11 and 12 of the cranks 9 and 10 and they slide axially within the cylindrical tube-shaped support 5 and 6 fastened to the back fork 13 of the bicycle, as can be observed in the FIGS. 8 and 9.

In FIG. 2 the detail of the connection between the bars 1 and 2 with their relative cranks 9 and 10 can be observed. The bars 1 and 2 present respectively a hole within which pivot 17 and 16 is fastened to the crank 9 and 10 by the interposition of a bushing and fixed by means of a nut. The connecting rods 7 and 8 present at their ends the holes 22 and 23 suited to receive the pedals 24 and 25. The propelling force is transmitted through the connecting rods 7 and 8 and the pivots 17 and 16 to the cranks 9 and 10, which are made to rotate around their axis 28 which, in turn, causes the rotation of wheel 29, rigidly connected with it. This implies the motion transmission to pinion 31 by means of chain 30 and, as a consequence, the rotation of the back wheel 32, rigidly connected with pinion 31, which causes the forward motion of the bicycle.

With the purpose of illustrating the advantages of the invention being under discussion, reference will be made to the FIGS. 3, 4, 5, 6 and 7, which show in a sequence the relative positions acquired by the pedals 24 and 25, the connecting rods 8 and 7, the cranks 10 and 9 in relation to each other during a complete clockwise rotation, taking one of the two heads of the crank from the upper dead point to the new upper dead point after performing a complete rotation of 360 degrees in clockwise rotation around the center of rotation 28.

Figure 3:
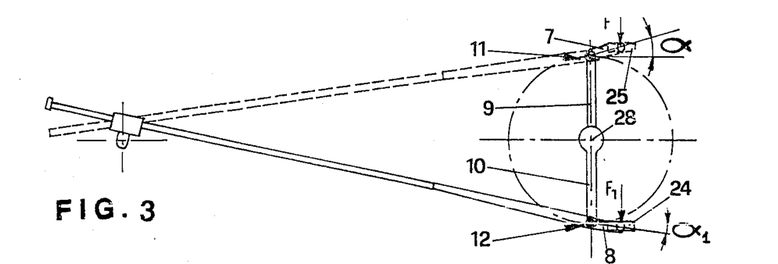
FIGS. 3, 4, 5, 6 and 7 show the relative positions of pedals, connecting rods, crank and bar at various stages of the motion.

FIG. 3 shows the initial position of the crank heads 11 and 12 in relation to each other in their upper and lower dead points, respectively.

In such a situation a vertical F force acting on pedal 25 and a vertical F1 force acting on pedal 24 are such as to create on axis 28 a resulting torque equalling the sum of the torques of the F and F1 forces respectively multiplied by the projections on the horizontal of the lengths of the connecting rods 7 and 8.

On the basis of what has been said, if we indicate with l the length of the connecting rods 7 and 8 and with $\alpha$ and $\alpha_1$ the respective angles formed by their longitudinal axis in relation to the horizontal, the torque can be expressed in analytical terms by the equation:

$$Mt3 = F \times l \cos\alpha + F_1 \times l \cos\alpha_1$$

At this point a first advantage of the invention becomes evident. It consists in the possibility of having at one's disposal at the axis 28 a torque differing from zero, although the crank heads 11 and 12 are respectively, in their upper and lower dead points, such situation being impossible in traditional-type bicycles.

Figure 4:
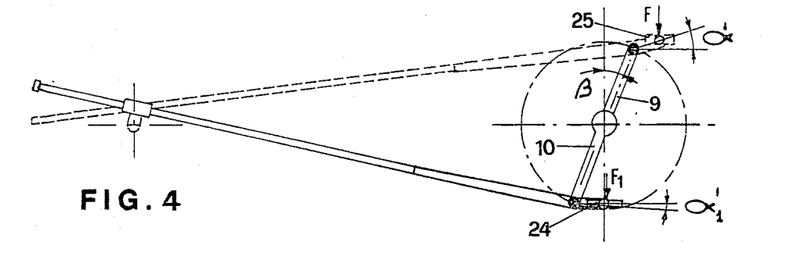

By continuing the clockwise rotation, a relative subsequent position which both the pedals and their respective connecting rods and cranks will acquire is the one represented in FIG. 4, where pedal 24 is in its lower dead point. Under such circumstances pedal 24 and the corresponding vertical force F1 acting on it exhausts its pushing action, since the arm of force F1 in relation to the center of rotation 28 is null, while force F acting vertically on pedal 25 will continue an action with a torque which, expressed in analytical terms results, if we indicate with b the length of the crank, in:

$$MT4 = F \times (l\cos\alpha^1 + b \sin\beta)$$

Figure 5:
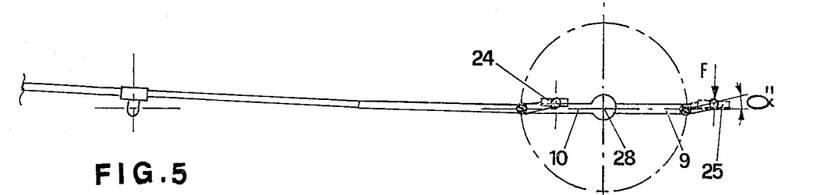

By continuing the rotation, another subsequent position which the pedals, the connecting rods and the cranks can acquire is the one represented in FIG. 5 where the cranks 9 and 10 are in the horizontal position. Under such circumstances pedal 24 is rotating toward its upper dead point and has already exhausted its pushing action, since the vertical force F is no longer acting on it, while pedal 25 keeps ono exerting a torque in relation to the axis of rotation 28, because it is still subject to the action of the downward vertical force F acting on it.

The torque transmitted by force F through pedal 25, expressed in analytical terms, will be:

$$MT5 = F \times (b + l \cos\alpha'')$$

Figure 6:
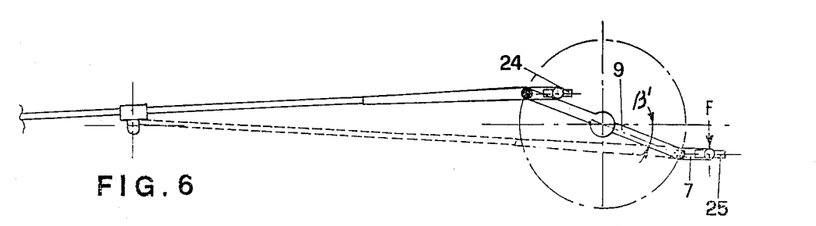

By continuing the vertical downward action of force F on pedal 25, the clockwise rotation will continue and at a certain instant the relative position of pedal 25, connecting rod 7 and crank 9 will be the one illustrated in FIG. 6. It is important to tke this position into consideration, since the longitudinal axis of connecting rod 7 will be horizontal at this point, while the longitudinal axis of crank 9 will form an angle $\beta'$ in relation to the vertical. The situation of the torque transmitted at this point, expressed in analytical terms, is expressed in the equation:

$$MT6 = F \times (l + b \cos\beta')$$

Figure 7:
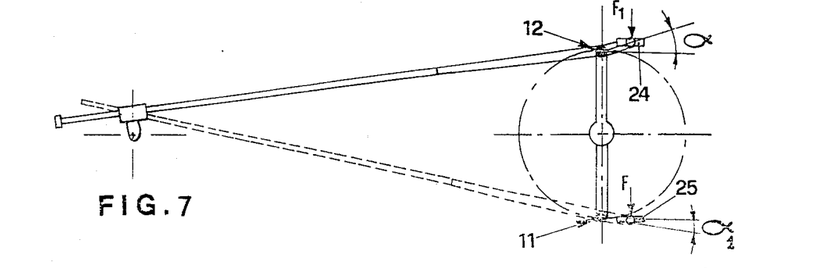

Continuing further with the rotation of the pedals around the center of rotation 28, under the action of the vertical force F acting on pedal 25, the configuration of FIG. 7, representing the relative position of the pedals, the connecting rods and the cranks, will be reached, where the crank-head 11 has reached its lower dead point, while the crank-head 12 has reached its upper deadpoint. At this point the same situation already represented in the preceding FIG. 3 will come about, but, in this case, it is rotated by 180° around axis 28.

The torque transmitted to axis 28 by the forces acting on the pedals will be analogous to the one which has previously been expressed, and it will be expressed in analytical terms by the equation:

$$MT7 = F1 \times l \cos\alpha + F \times l \cos\alpha_1$$

It can be observed that the formula expressing MT7 is the same as the formula expressing MT3 with F replacing F1 and vice-versa.

From this point on, continuing further the rotation under the action of force F1, always acting on pedal 24, said pedal will go from its upper dead point to its lower dead point, accomplishing a complete rotation of 180° around its center of rotation 28, and thereby the same significant situations already seen and studied in the preceding FIGS. 4, 5, 6 and 7 will be repeated exactly.

The analysis of the formulas which express the values of the torques transmitted to axis 28 leads to the conclusion that there are no pairs of kinematically compatible values of $\alpha$ and $\beta$ rendering void the second term of the above-mentioned equations. Therefore, the solution suggested by the invention realizes a transmission in which the torque is never zero.

It can then be easily understood that another advantage of the proposed invention is the realization of a much more uniform movement, since at every instant positive torque situations arise.

From a further analysis of the formulas expressing the values of the transmitted torques in the various situations represented in the various figures, it can be noticed that there is also an additional term $F \times l$, due to the presence of the connecting rod 7 and 8 having an l length in the kinematic device under examination.

The presence of such connecting rod having length l gives rise, in analytical terms, to an increase in the value of the transmitted torque, which adds to the value of the torque exerted by the presence of the crank having length b and indicated in the drawings with numbers 9 and 10. In turn, this fact represents yet another advantage of the invention being the object of the present description, since it creates a transmission which, not only does not present instants with a zero torque, as has already been said, but also develops a higher torque value. Besides, this result is obtained without varying, in relation to the ground, the height of axis 28, passing through the center of rotation of the cranks, and without increasing the legs straddling angle in order to accomplish the thrust of the foot on the pedal. In fact, as can be observed in FIG. 9, the cranks 9 and 10 rotate around the center of rotation 28 describing a circle, the radius of which is equal to the length of the crank which has been indicated with the letter b, while the pedals 24 and 25, which are respectively mounted on the axes 53 and 51, rotate around axis 54.

On the basis of the dimensions given on the drawing of FIG. 9, where b represents the length of the cranks 9 and 10 and l represents the length of the connecting rods 7 and 8, it can be observed that the distance between the axes 51 and 53 is equal to length 2b, i.e. equal to twice the length of a crank, which means that the diameter of the circumference described by the pedals during their 360° rotation is equal to the diameter of the circumference described by the same rotation of the heads 11 and 12 of the cranks 9 and 10.

For this reason, the physical feeling of the thrust of the foot on the pedal, which is experienced when pedalling a bicycle provided with the kinematic device being the object of the invention, will be the same as the one experienced when pedalling a normal bicycle.

Figure 13:
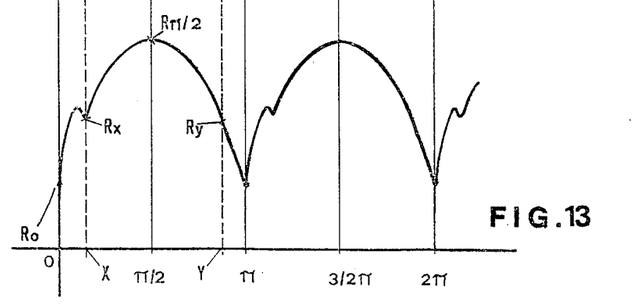
FIG. 13 is the diagram resulting from the two torques of the kinematic device.

The torques transmitted to axis 28 and generated by the forces F and F1, acting respectively on the pedals 25 and 24 of the torque multiplying device being the object of the present invention, are represented in the diagram of FIG. 13, representing in the longitude the values in radians concerning the various positions acquired by the crank heads 11 and 12 during the rotation from 0° to 360°, while the values of the torque are indicated in the latitude.

Said diagram has been obtained by applying the principle of superimposition of the effects, which allows the study of the global torque generated by the cranks 9 and 10 and by the connecting rods 7 and 8, by studying separately the torque values generated by each of these and then adding them up.

Figure 10:
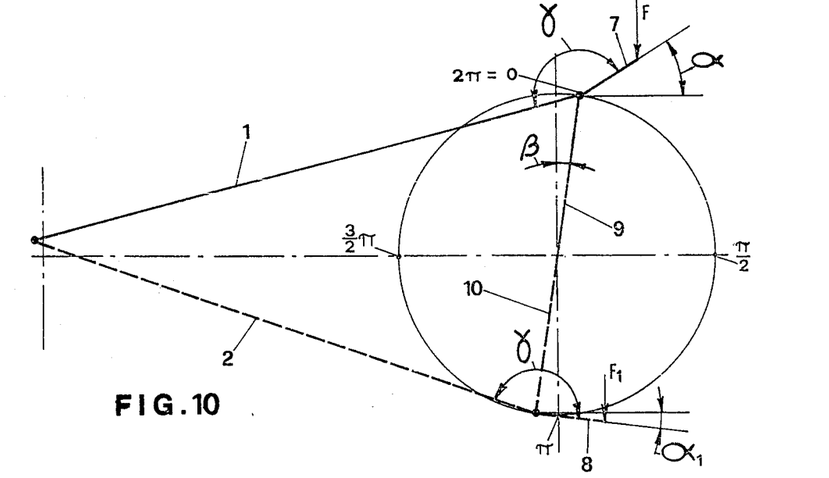
FIG. 10 is a scheme of a generic position of the kinematic device of the invention.
Figure 11:
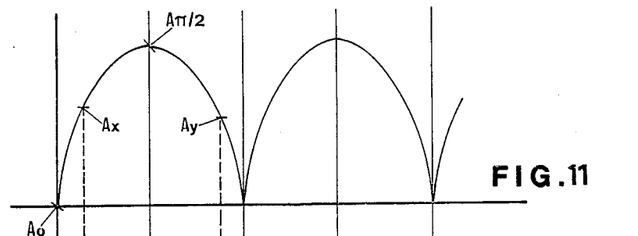
FIG. 11 shows the course of the torques due to the crank.
Figure 12:
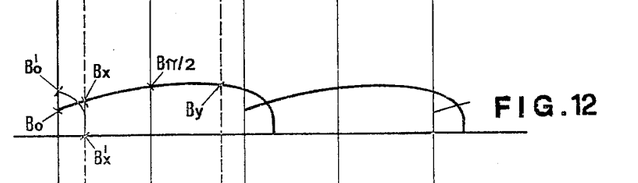
FIG. 12 shows the course of the torque concerning the connecting rod of the kinematic device.

With reference to the schematic drawing of FIG. 10 which represents bar 1, crank 9 connected with it and the connecting rod 7, (said scheme being applicable also to bar 2, crank 10 connected with it and the connecting rod 8), the torque generated by force F acting on the connecting rod 7 is represented in the latitude in the diagram of FIG. 12. The torque generated by the same force acting on crank 9 is represented in the latitude in the diagram of FIG. 11 which also represents the movement of the torque generated by the thrust of the foot on the pedals on a normal bicycle with the crank having the same length.

The sum of the two diagrams is represented in the diagram of FIG. 13.

With reference to the diagrams of the FIGS. 13, 12 and 11, it can be observed that in correspondence with the position of 0 radians, relating to the configuration of the kinematic device of FIG. 3, there is a correspondence of the torque resulting from the value indicated in the latitude in correspondence with point Ro on the diagram of FIG. 13. Said value results from the sum of the torque due to the action of the cranks 9 and 10, the value of which corresponds with point Ao on the diagram of FIG. 11, and of the torque due to the action of the connecting rods 7 and 8, the value of which corresponds respectively with point B'o and B'O on the diagram of FIG. 12.

In the same way, in correspondence with the position of $\pi/2$ radians, relating to the configuration of the kinematic device of FIG. 5, there is a correspondence of the torque resulting from the value indicated in the latitude in correspondence with point $R\pi/2$ on the diagram of FIG. 13, said value being the resultant of the sum of the values corresponding with the points $A\pi/2$ and $B\pi/2$ respectively on the diagrams of FIG. 11 and FIG. 12.

The torque resulting from the value indicated in the latitude in correspondence with point Rx on the diagram of FIG. 13 corresponds with the configuration of the kinematic device of FIG. 4, relating to the position which will be indicated with X radians.

Said value results from the sum of the values corresponding to the points Ax on the diagram of FIG. 11 and Bx and B'x on the diagram of FIG. 12.

It can be observed that in correspondence with the position of X radians the diagram of FIG. 13 presents a minimum at point Rx, due to the fact that the torque value corresponding to point B'x is zero, since pedal 24 in this position is at its lower dead-point position, it has exhausted its pushing action. The kinematic configuration of FIG. 6 corresponds with a position of y radians comprised between $\pi/2$ and $\pi$ radians with Ry torque value, said resultant being the sum of the partial torques By and Ay. For the positions between $\pi 2$ and $\pi$ radians, the just described situation will be repeated.

It will now be obvious how the torque-multiplying kinematic device being the object of the described invention reaches all the proposed goals.

From the layout of the diagram of FIG. 13, representing the movement of the function regarding the formulas of the above-mentioned torques, it will be pointed out that the points of minimum and maximum torque are a function of angle $\rho$, which characterizes the bars 1 and 2. As far as the maximum values of the torque are concerned, these depend on the angle $\alpha$, the length of the connecting rods 7 or 8 being equal.

Obviously the optimization of the $\alpha$ and l parameters is in view of the need to avoid that there may be a contact between the pedal and the ground at the lower dead point.

Figure 14:
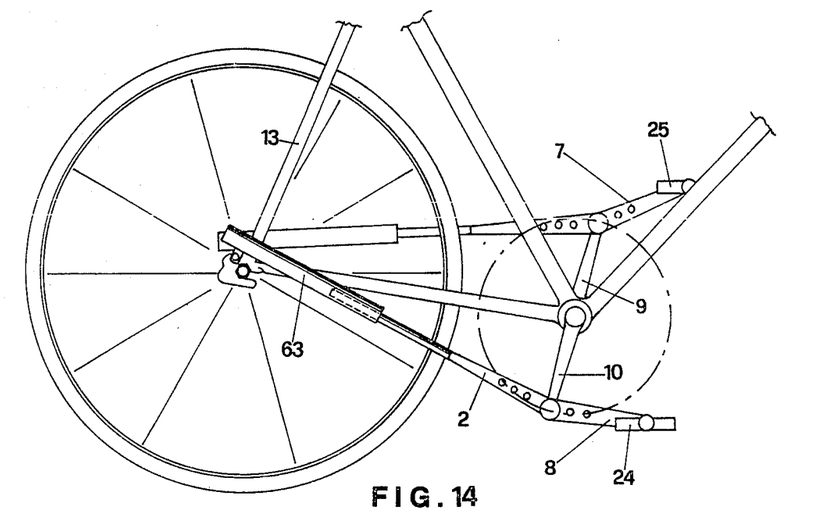
FIG. 14 is a construction variation of the connection between the bar of the kinematic device and the guiding tube.

A variation concerning the same idea of solution is represented in FIG. 14 and it foresees the replacement of the guiding tube 6 with a tube 63, which is longer, but which foresees, on the other hand, the shortening of bar 2, so as to prevent the protrusion of said bar beyond the rear axis 55 of the wheel.

Figure 15:
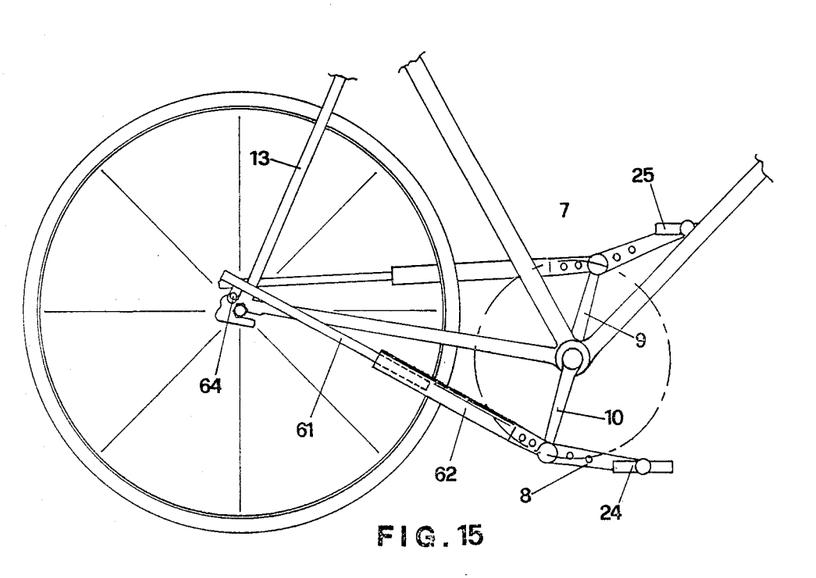
FIG. 15 is another variation of the connection of FIG. 14.

Yet another variation is represented in FIG. 15, where bar 2 is replaced by tube 62 which houses in its interior the cylindrical bar 61 fastened to the back fork 13 of the bicycle by means of pivot 64, which is connected with said fork and allows its oscillation. In this case, too, the rear protrusion during the movement of the kinematic device is prevented.

During its execution, the invention can even acquire shapes differing from the illustrated one, and modifications of a constructive nature can be applied, without exceeding the scope of the present invention.

What we claim is:

1. A torque-multiplying kinematic device, particularly adapted for use on bicycles, comprising:
    a pair of rods, each of said rods having an intermediate angled junction dividing said rod into a foremost portion and a rearmost portion, said foremost portion being inclined at one angle upwardly relative to said rearmost portion, each said junction of each said rod having at least one junction aperture in the vicinity of said junction of said foremost and rearmost portions, and each said foremost portion having an end aperture near the end opposite said junction, said end aperture being adapted to mount a pedal of a bicycle;

a pair of pivot means, one of said pivot means being adapted to be inserted into one of said junction apertures of each of said rods for fastening each of said rods to a crank of a bicycle; and a pair of guiding supports, each of said guiding supports corresponding in slideable relationship with one of said rods via said rearmost portion of said rod, and each of said guiding supports being adapted to be fastened to a back fork of a bicycle so that each of said guiding supports rotates about an axis substantially parallel to the rotational axis of a wheel mounted between the back fork of a bicycle;

wherein where the foremost of one of said rods is in a substantially horizontal position at a bottom dead center of said crank, a maximum additive torque is produced and a minimum clearance above ground surface sufficient to avoid ground surface engagement is obtained.

2. The torque-multiplying kinematic device according to claim 1, wherein each of said supporting guides includes a tube-shaped section within which said rearmost portion of said corresponding rod axially reciprocates in slideable relationship, said rearmost portion of said corresponding rod having a generally cylindrical cross section.

3. The torque-multiplying kinematic device according to claim 2, wherein each said tube-shaped section is greater in length than said corresponding rearmost portion such that during reciprocation by each said corresponding rearmost portion, each said corresponding rearmost portion neither disengages from said corresponding tube-shaped section ono a forward stroke nor extends rearward beyond the rotational axis of the rear wheel on a rearward stroke.

4. The torque-multiplying kinematic device according to claim 1, wherein each of said guiding supports includes a bar having a generally cylindrical cross section, and said rearmost portion of each of said corresponding rods includes a tube-shaped segment within which said corresponding bar axially reciprocates in slideable relationship.

5. The torque-multiplying kinematic device according to claim 1, wherein said pivot means are cylindrical.

6. A method of increasing the torque produced by cranks of a rear wheel chain driven bicycle, comprising the following steps:

disengaging each pedal assembly from said cranks of said bicycle;

engaging to each of said cranks, in place of each of said pedal assembly, a pivot connector means;

mounting on each said pivot connector means one of a pair of rods, each of said rods having an intermediate angled junction dividing said rod into a foremost portion and a rearmost portion, said foremost portion being inclined at an angle upwardly relative to said rearmost portion, each said junction of each of said rods having at least one aperture for receiving said pivot connector means, and each said foremost portion having an end aperture near the end opposite said junction, said end aperture being adapted to mount one of said pedal assemblies;

attaching each of said pedal assemblies in one of said corresponding end apertures; and affixing a pair of guiding supports to a back fork of said bicycle so that each of said guiding supports rotates about an axis substantially parallel to the axis of a wheel mounted between said back fork of said bicycle, each of said guiding supports corresponding in sliding relationships with one of said rods via said rearmost portion of said rod;

wherein when the foremost portion of one of said rods is in a substantially horizontal position at a bottom dead center of said crank, a maximum additive torque is produced and a minimum clearance above ground surface sufficient to avoid ground surface engagement is obtained.

7. A method of increasing the torque produced by cranks of a rear wheel chain driven bicycle, which comprises:

engaging a pivot connector means to each of said cranks;

mounting on each said pivot connector means one of a pair of rods, each of said rods having an intermediate angled junction dividing said rod into a foremost portion and a rearmost portion, said foremost portion being inclined at an angle upwardly relative to said rearward portion, each said junction of each of said rods having at least one aperture of receiving said pivot connector means, and each said foremost portion having an end aperture near the end opposite said junction, said end aperture being adapted to mount a pedal assembly;

attaching a pedal assembly in each of said corresponding end apertures; and affixing a pair of guiding supports to a back fork of said bicycle so that each of said guiding supports rotates about an axis substantially parallel to the axis of a wheel mounted between said back fork of said bicycle, each of said guiding supports corresponding in sliding relationship with one of said rods via said rearmost portion of said rod;

wherein when the foremost portion of one of said rods is in a substantially horizontal position at a bottom dead center of said crank, a maximum additive torque is produced and a minimum clearance above ground surface sufficient to avoid ground surface engagement is obtained.

* * * * *